May 12, 1931.                U. G. CHARLES                 1,804,744
                             HYDRAULIC CLUTCH
                      Filed Dec. 27, 1929      2 Sheets-Sheet 1
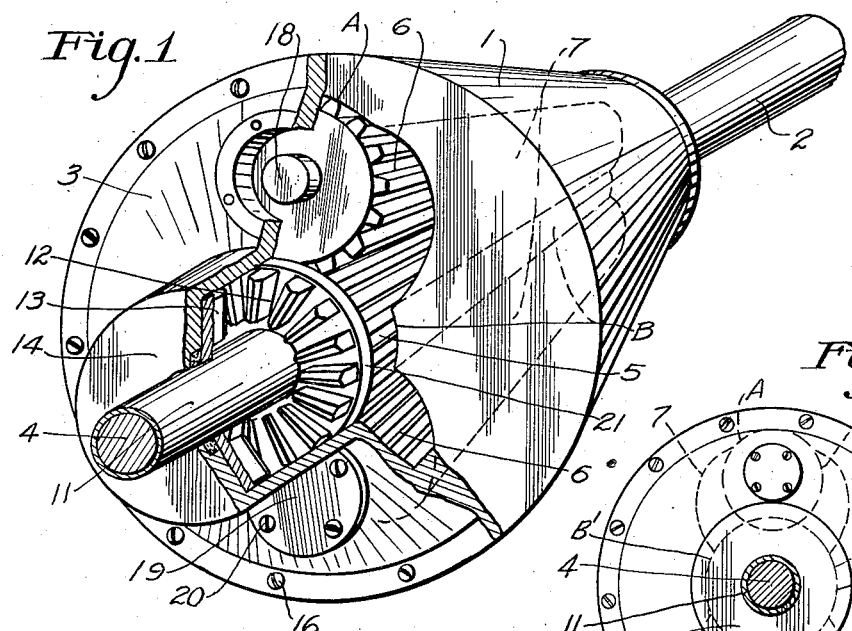
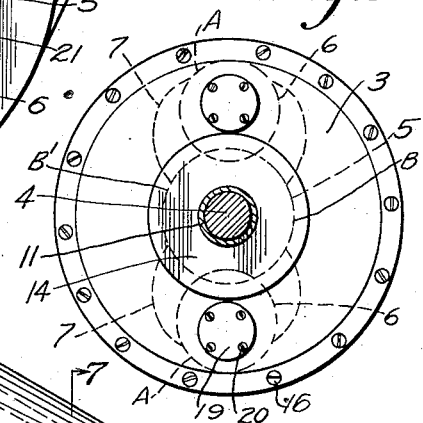
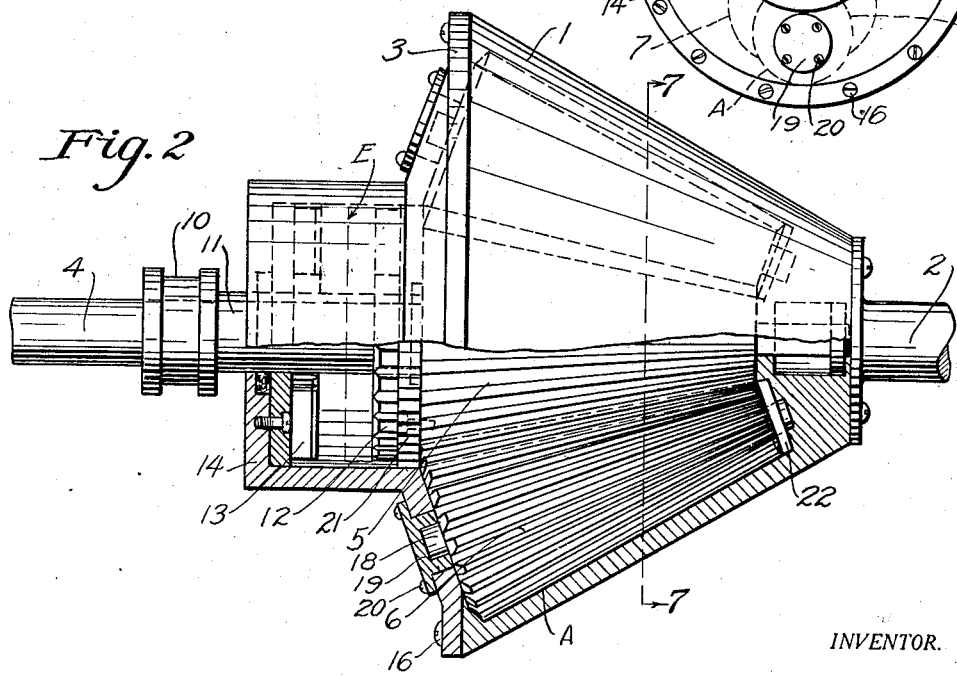
INVENTOR.
BY U. G. Charles May 12, 1931. U. G. CHARLES 1,804,744
HYDRAULIC CLUTCH
Filed Dec. 27, 1929  2 Sheets-Sheet 2
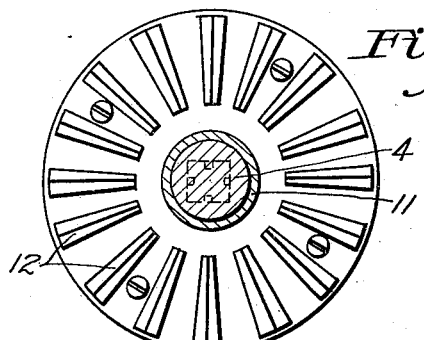
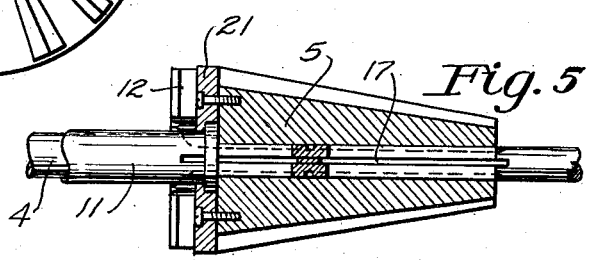
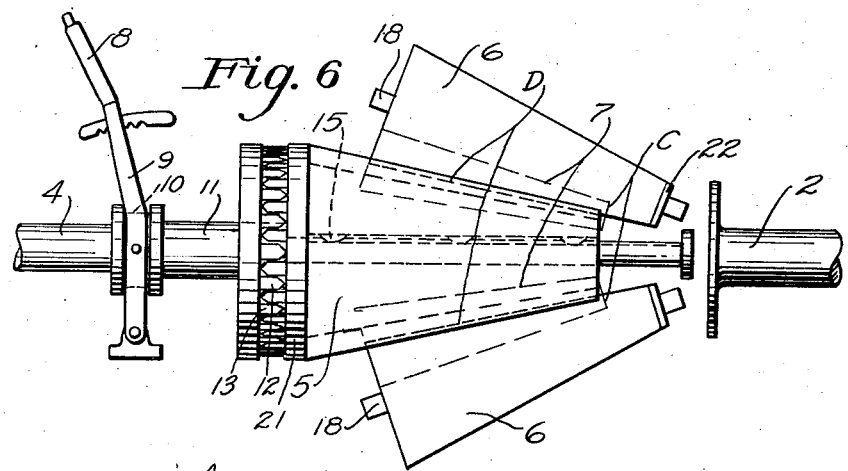
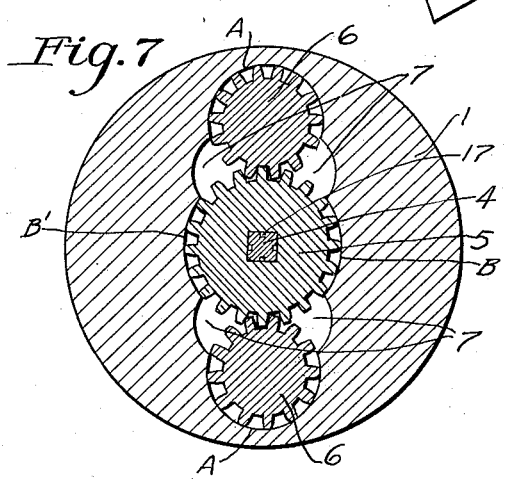
INVENTOR.
BY U. G. Charles Patented May 12, 1931

1,804,744

UNITED STATES PATENT OFFICE

ULYSSES G. CHARLES, OF WICHITA, KANSAS, ASSIGNOR OF ONE-FOURTH TO DARCEY E. DUNNE, JR., OF WICHITA, KANSAS

HYDRAULIC CLUTCH

Application filed December 27, 1929. Serial No. 416,864.

My invention relates to improvements in a hydraulic clutch.

The object of my invention is to provide a simple and inexpensive mechanism to function as a clutch.

A further object of my invention is to provide a clutch mechanism that is void of springs and reciprocating movements subject to the rotation of the internal working members.

A still further object of my invention is to eliminate the use of check valves, pipe conveying means, or any of the elements of the by-pass mechanisms commonly employed.

A still further object of my invention is to provide a hydraulic clutch in which the wear of the release and compression elements tends to seat them more perfectly.

A still further object of my invention is to provide a hydraulic clutch rotatable in either direction and controlled by the same method employed to engage and disengage the compression required.

A still further object of my invention is to provide a hydraulic clutch that will gradually transmit the torque from the drive shaft to the driven shaft until the driven shaft is in equal rotation with the drive shaft, at which time the clutch may be brought into rigid engagement and simultaneously release the fluid compression.

These and other objects will hereinafter be more fully explained, reference being had to the drawings forming a part of this specification, in which like characters will apply to like parts in the different views, and in which:—

Fig. 1 is a perspective view of the clutch, with parts removed for convenience of illustration.

Fig. 2 is a side view of the clutch partly in section.

Fig. 3 is a reduced drawing of the end adjacent the drive shaft.

Fig. 4 is a plan view of one member of the rigid engaging element attached to the master gear, the other element having similar teeth but being rigidly connected to the housing, Fig. 5 is a longitudinal section thru the master gear.

Fig. 6 is a diagrammatical view of the conical gears, showing the position when the hydraulic compression is released and the rigid engagement is made.

Fig. 7 is a cross section taken on line 7—7 in Fig. 2, showing a modification of the compression chamber.

My invention herein disclosed consists of a plurality of conical gears operatively positioned in a housing that is axially aligned with a drive shaft and a driven shaft, allowing the power to be gradually transmitted to the driven shaft until both shafts rotate equally, at which time a rigid engagement may be made by the simple means provided, thus eliminating slipping or flexibility that might otherwise occur, the last said means being optional with the operator. The component parts employed for the function of the above brief disclosure consists of a housing 1 rigidly connected to a driven shaft 2 and axially aligned therewith, the said housing having a head 3 removably arranged as accessible means to the interior of the housing. Axially aligned with the driven shaft is a drive shaft 4 that is trunnioned in the housing as hereinafter disclosed, and adapted to cause rotation of the housing thru the medium of a master gear 5, slidable longitudinally thereon and rotatable therewith, the said master gear being frusto-conical in shape and in mesh with a pair of frusto-conical gears 6 diametrically positioned, trunnioned in the housing, and adapted to rotate with a smooth running fit, the outer points of the teeth being seated in the housing as at A, and functioning as a sealing means between their respective compression chambers 7, as outlined by dotted lines in Fig. 3, or as shown in Figs. 1 and 7. The master gear is adapted to seat in the housing with a smooth running fit of the points of the teeth seated on the wall portions oppositely positioned as at B and B', by which means the compression chambers 7 are separated with respect to the master gear when the said gear is forced toward the driven shaft 2 thru the medium of a lever 8, having a yoke 9 engaging in an annular groove 10 positioned on the outer end of the sleeve 11 that is secured to the master gear.

It is now readily seen that the conical gears are adapted to seat in conical bores coinciding with the shapes of the respective gears, and having outwardly extending compression chambers as heretofore described, the said chambers extending longitudinally to the bore from the large end thereof to near the termination of the smaller end, but being spaced therefrom as shown by dotted lines C in Fig. 6, and when so positioned the compressed fluid therein is partially sealed until the master gear is moved outward to rigid engagement as shown in Fig. 6 at which time the compressed fluid is free to exhaust beneath the small end of the master gear simultaneously with the exhaust between the engaging teeth of all of the gears as the said master gear is being drawn outward, it being understood the outer end portion of the gear teeth will remain in mesh, as shown by dotted lines D in Fig. 6.

On the outer end of the master gear is a series of radially positioned teeth 12, said teeth adapted to mesh with a similar series of teeth 13 that are secured in the end of the hub 14, by which means the master gear may be brought to rigid engagement with the housing as turning means therefor, it being understood that the said master gear is arranged to rotate with the drive shaft thru the medium of a pair of keys 15, longitudinally positioned on the drive shaft to slidably engage in a keyway positioned in the bore of the gear. Other means however may be provided, such as a spline fitting, a square shaft or one polygonal in section, all of which will permit the master gear to slide longitudinally on the shaft and rotate therewith.

As a simple means of filling the compression chambers or other voids within the housing, I have arranged an aperture in registry with the outer ends of the said compression chambers, thru which fluid may be injected and sealed by the threaded engagement of cap screws 16, substantially as shown in Fig. 3. As a means of allowing displacement of the fluid at either end of the master gear when said gear is moved longitudinally, a duct 17 is arranged to pass thru said gear, thru which the fluid will flow as the gear is being moved.

To operate the clutch herein disclosed: We will assume that the master gear is drawn outward so that the teeth 12 are positioned approximately as shown by the dotted line E Fig. 2, the clutch being in neutral; that is to say, the master gear is free to rotate without compressing the fluid in the chambers 7, as the teeth of the gears are separated by reason of the conical form of the gears. By moving the master gear inward, the teeth gradually close the space therebetween until they come in solid contact, at which time the fluid carried by the space between the teeth will be ejected into each of the oppositely disposed compression chambers from which the said teeth are traveling as they come in contact, it being understood that the fluid from the adjacent chambers is being carried around as long as rotation of the gears is possible. The rotation thereof will cease under the compression and power from the drive shaft will be transmitted to the housing and the driven shaft connected thereto, making the rotation of the drive and driven shafts equal. To avoid loss of motion between the drive and driven shafts, the master gear may be retracted until the teeth on the outer end of the gear are in mesh with the teeth of the hub, as shown in Fig. 6, the latter movement being for rigid engagement of the drive shaft and the driven shaft. When the clutch is positioned in neutral, the drive shaft is free to rotate without a transfer of torque of any consequence to the driven shaft, regardless of the speed acquired by spinning the engine, and the gears will rotate freely, since the points of the gear teeth are slightly in mesh as heretofore described, but not sufficient to cause compression of the fluid.

As a convenient means of assembling the clutch, the outer spindles 18 of the gears are trunnioned in bearing plates 19 that are securely attached to the head 3, the said plate and the peripheral edge of the head being made oil tight by grinding the joint or by placing therebetween suitable gaskets, it being understood that the said plate and the head are securely attached by a plurality of cap screws 20. The sleeve sliding in the aperture of the head may be equipped with packing as desired.

While I have shown gears of a certain conical form, the same may be varied as the case may require, but in all cases the conical form shall be sufficient to cause separation of the teeth of the gears when the master gear is being moved outwardly, the function being similar to that of a wedge primarily.

As a means of sealing the ends of the teeth at the outer or large ends of the side gears, a head 21 is positioned on the larger end of the master gear so that the peripheral edge thereof will extend over the points of the teeth of the last said gear and under which the points of the side gear will snugly engage when the master gear is forced inward. A similar arrangement of a head 22 is positioned on each of the smaller ends of the side gears, against which the adjacent end of the master gear teeth will engage being so arranged that the wearing away of the gear structures will cause them to snugly engage continuously and the wedge tendency of the master gear will cause snug engagement of the teeth of the side gears at their respective bearing points.

Such modifications may be employed as lie within the scope of the appended claims, and having fully described my invention, what I claim as new and desire to secure by Letters Patent is:—

1. In a hydraulic clutch, a drive and a driven shaft, a housing axially aligned with said shafts and being securely attached to one of the shafts, the housing having compression chambers and being filled with fluid, conical gear elements positioned in the housing, one of the gears slidably engaging on one of the shafts and rotatable therewith, and means to move the gear longitudinally to control the compression of fluid within the housing.

2. In a hydraulic clutch, a housing, a plurality of conical gear elements trunnioned in the housing, the housing having compression chambers adjacent the conical gears, a shaft rigidly attached to the housing and a second shaft trunnioned in the housing, the said shafts and housing being axially aligned, a conical gear to slidably engage on one of the shafts and rotatable therewith, the teeth of the last said gear to be in mesh with the teeth of the first said gears as controlling means for the compression of the fluid placed within the housing as the last said gear is moved longitudinally on its respective shaft, and means to rigidly engage the last said gear with the housing by a further longitudinal movement and means to move said gear along its respective shaft.

3. In a hydraulic clutch, a housing and a driven shaft securely attached in axial alignment thereto, the housing having a plurality of compression chambers positioned therein and a plurality of conical gear members trunnioned in the housing and being positioned so that each gear will have a pair of compression chambers adjacent thereto, otherwise the gears having a smooth running fit for the teeth engagement in the housing, a drive shaft trunnioned in the housing and axially aligned with the driven shaft, a conical gear to slidably engage on the drive shaft and rotatable therewith, the said gear adapted to seat in the housing so the teeth thereof will have a smooth running fit and adapted to engage with the first said gears as sealing means between the gears when compression of the fluid is desired, and means to withdraw the second said gear from snug engagement to release the compression, by which means the rotation of the driven shaft is controlled.

4. In a hydraulic clutch, a housing having two pairs of compression chambers oppositely disposed with respect to the axis of the housing and being filled with fluid, a pair of frusto-conical gears trunnioned in the housing and positioned in working relation to each of the pairs of said chambers, a master gear axially positioned within the housing and being in mesh with each of the other gears, a drive shaft axially extending into the housing on which the last said gear is positioned and rotatable therewith but adapted to slide longitudinally thereon, by which means the rotation of the housing is controlled by the sliding movement of the last said gear on its respective shaft controlling the compression of the fluid and means to slide the gear.

5. In a hydraulic clutch, a housing, a conical gear positioned in the housing and means to move the said gear longitudinally, other conical gears positioned in the said housing in working relation to the first said gear, the housing having a pair of compression chambers to each of the second said gears and being filled with fluid, and positioned in working relation to the first and second said gears by which means the rotation of the housing is controlled by the longitudinal movement of the first gear.

6. In a hydraulic clutch, a housing subject to rotation and being axially positioned in a power transmitting shaft, the shaft being divided and consisting of a drive and a driven portion, the driven portion rigidly connected to the housing, the drive portion rotatably arranged in the housing, a conical gear positioned in the housing and means to move the said gear longitudinally on the drive shaft, other conical gears positioned in the said housing in working relation to the first said gear, the housing having a pair of compression chambers to each of the second said gears and being filled with fluid, and positioned in working relation to the first and second said gears by which means the rotation of the housing is controlled by the longitudinal movement of the first gear.

In testimony whereof I affix my signature
ULYSSES G. CHARLES.